May 26, 1936.  F. W. SCHRODER ET AL  2,041,967
CORRUGATED SHEET AND PROCESS FOR MAKING SAME
Original Filed April 25, 1930  2 Sheets-Sheet 1
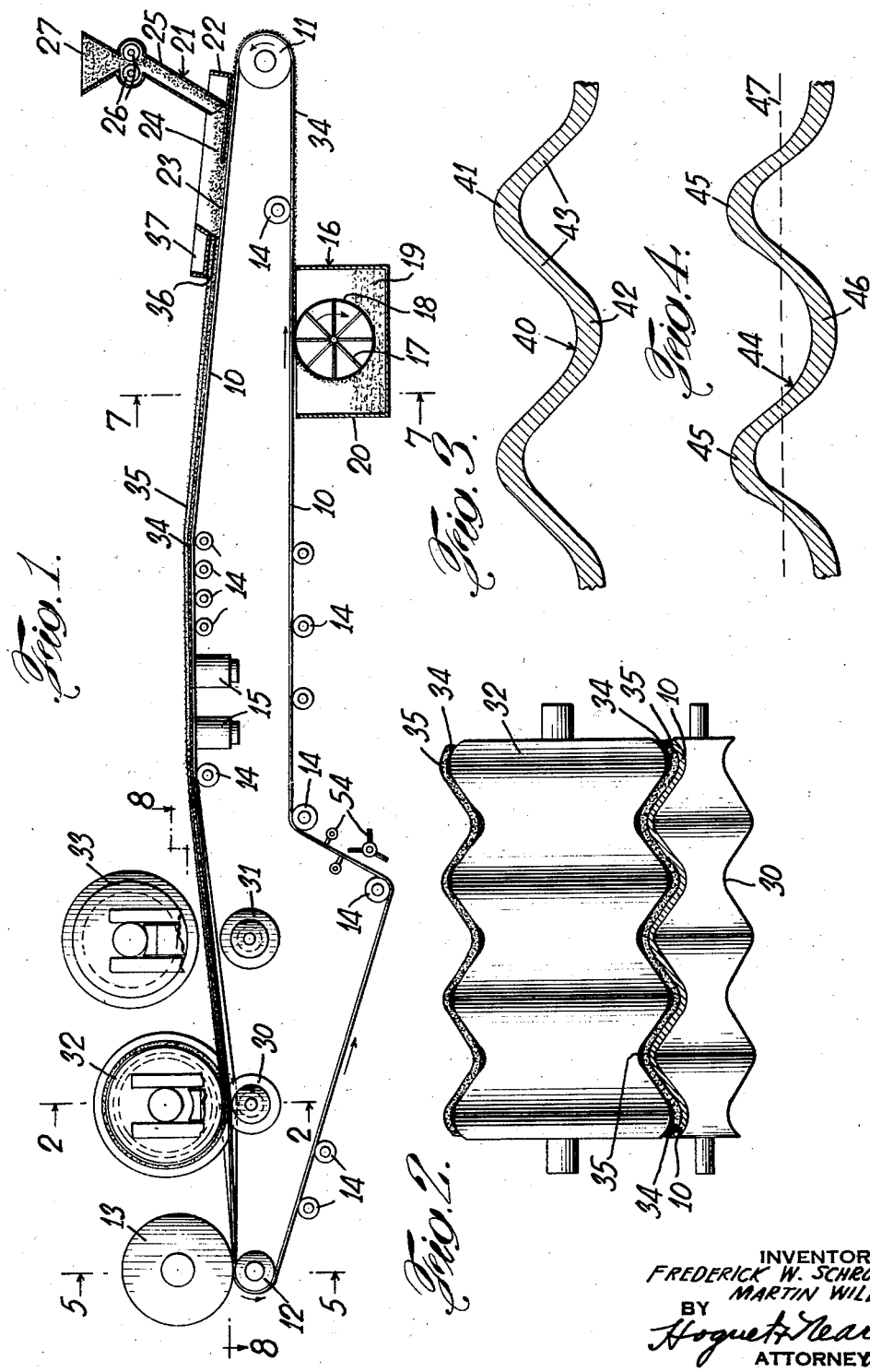

May 26, 1936. F. W. SCHRODER ET AL 2,041,967
CORRUGATED SHEET AND PROCESS FOR MAKING SAME
Original Filed April 25, 1930 2 Sheets-Sheet 2
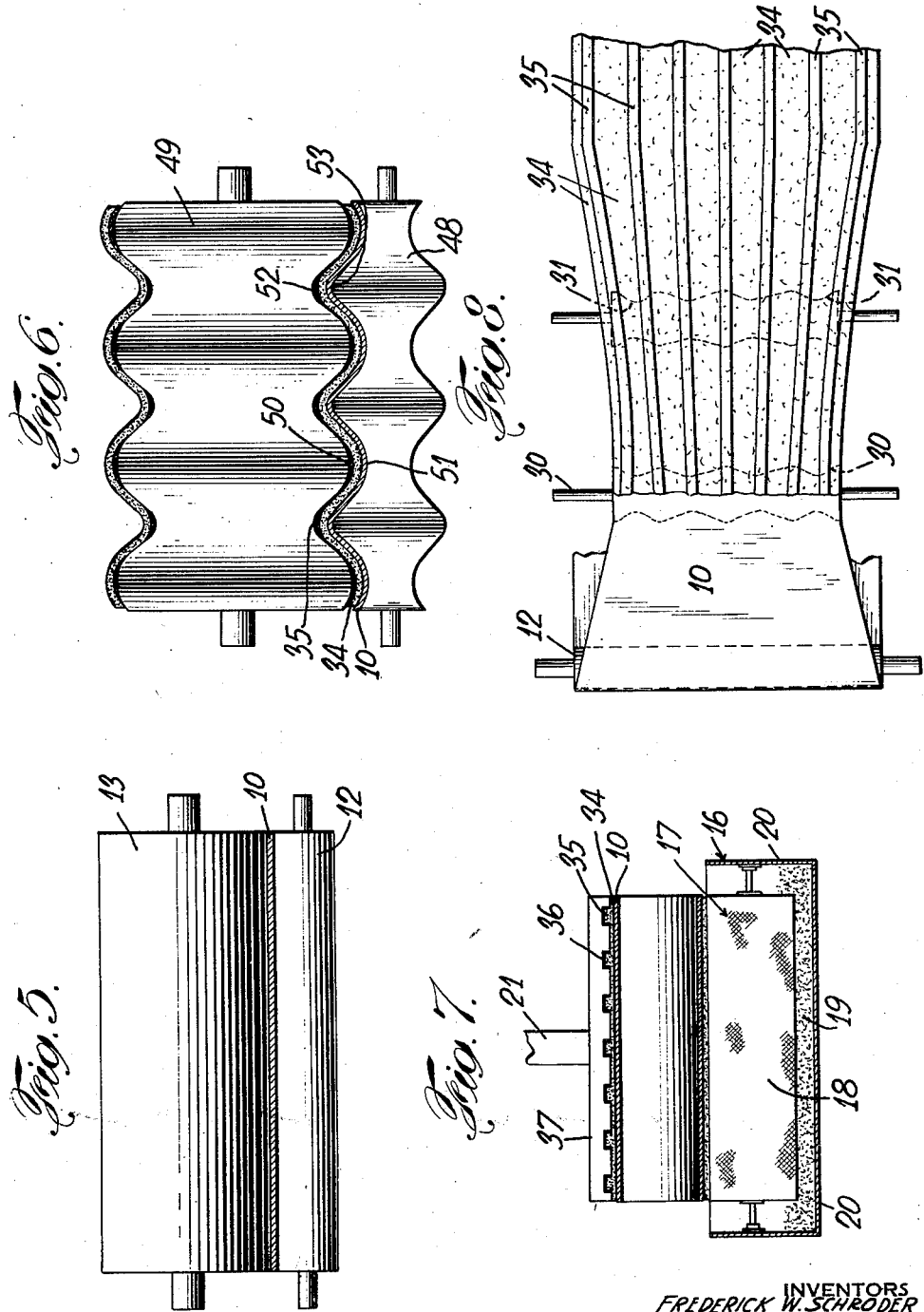
INVENTORS
FREDERICK W. SCHRODER
MARTIN WILLIS
BY
ATTORNEYS Patented May 26, 1936

2,041,967

UNITED STATES PATENT OFFICE 2,041,967

CORRUGATED SHEET AND PROCESS FOR MAKING SAME

Frederick W. Schroder and Martin Willis, New Orleans, La., assignors to R. J. Dorn Co., Inc., a corporation of Louisiana Application April 25, 1930, Serial No. 447,150
Renewed May 19, 1934

15 Claims. (Cl. 154—33)

This invention pertains generally to the manufacture of sheets, and particularly to the manufacture of corrugated sheets from pasty or pulpy compositions.

While the invention may be applied to the manufacture of many other products, it will be explained in connection with the manufacture of sheets from mixtures of fibrous material such as asbestos, for example, with hydraulic cement, in the presence of water. Many compositions of this character are known in the art.

The asbestos, cement and water are worked up into a thin pasty or pulpy mass which is deposited upon an endless rotating coarse fabric or felt, hereinafter referred to as a conveyor, through which the water or other liquid of the thin paste or pulp flows off leaving on the upper side the cement intermixed with asbestos in a thin layer. The endless conveyor passes between rotating rollers. The thin layer is taken up by the upper roller and is rolled up thereon. Prior to our invention when the material had attained the desired thickness on the upper roller, it was removed therefrom by cutting transversely of the roller, lifting one of the ends, and then stripping the material from the roller while in motion.

When the sheet is built up to any considerable thickness the conveyor is apt to be injured when the trailing end of the sheet passes out from under the upper roller, due to the upper roller dropping on to the portion of the conveyor between the rollers.

There are various types of machines in use for the production of sheets in this manner. However, prior to our invention the sheets made by these machines have been flat. The production of corrugated sheets necessitated a further operation such as pressing between matrices etc.

According to our invention corrugated sheets are formed at the same time that the thin layers are picked up from the conveyor. For this purpose we employ corrugated meshing upper and lower rollers between which the conveyor passes. The thin layers from the conveyor are picked up by an upper corrugated roller and are formed into a sheet of any desired thickness. The sheet may then be removed from the roller by any of the usual means.

To avoid injury to the conveyor occasioned by the trailing end of a sheet passing out from under an upper roller, we may provide a plurality of sets of upper and lower rollers which contact the conveyor at different points. The arrangement is such that only one upper roller removes the thin layer from the conveyor at any one time. When the sheet has been built up to the desired thickness, the roller together with its adhering sheet is removed by any suitable means such as a traveling overhead crane, and another upper roller is placed in contact with the conveyor to pick up the thin layer. This change may be accomplished without stopping the conveyor.

While the conveyor, in changing its direction to return for further paste or pulp, may pass around a corrugated lower roller and be propelled thereby, the traction being assisted by the weight of an upper corrugated roller, we may provide a set of smooth rollers for this purpose at a point beyond that at which the layer is removed from the conveyor.

Sheets of this type when placed in use are very often superimposed or overlapped. In order to insure proper meshing or nesting of the various corrugated portions of one sheet with those of another, additional thicknesses may be provided at crests and vales of the sheets. To provide the additional material required to form thickened crests and vales we may deposit additional material, such as cement or asbestos or the two combined, either wet or dry, upon the thin layer of paste or pulp already on the conveyor. This additional material may be deposited in the form of strips so arranged as to pass between the rollers at the proper points.

The material of which sheets of this character are made is often capable of resisting considerably greater compressive stresses than tensile stresses. The sheets very often bear a load which is applied from one side only. To provide a sheet capable of supporting a greater load without material increase in raw materials, and thus also avoiding the consequent increase in the weight of the sheet, we may construct the sheet with a considerably greater portion of material on one side of a transverse center line through the sheet than on the other. When in use the sheet is so arranged that the side of the sheet having the greater amount of material is subjected to tensile stresses, and the side having the lesser amount of material is subjected to compressive stresses. To manufacture a sheet of this character it is necessary to use corrugated rollers conforming to the desired form of sheet. For instance the crests may have a radius or radii different from that or those of the vales.

Our invention may be adapted to various types of apparatus for the purpose of carrying out the same. We have illustrated in the accompanying drawings apparatus incorporating our corrugated rollers. However, it is understood that this is merely by way of example.

In the drawings;

Figure 1 is a diagrammatic view in side elevation of a wet machine with our invention adapted thereto.

Figure 2 is a section on line 2—2 of Figure 1.

Figure 3 is a cross section through a finished sheet illustrating the thickened crests and vales.

Figure 4 is a cross section through a finished sheet showing crests and vales of different radii.

Figure 5 is a section on line 5—5 of Figure 1, showing the smooth end rollers.

Figure 6 is a sectional view of a set of corrugated rollers adapted to form a sheet having crests and vales of different radii.

Figure 7 is a section on line 7—7 of Figure 1, and

Figure 8 is a view taken on line 8—8 of Figure 1 with the upper rollers and the accessory structure removed.

Referring to the drawings, at 10 is shown an endless conveyor which is supported at its ends by rollers 11 and 12, and which passes over a plurality of intermediate supporting rollers 14. 15 represents drying mechanism shown conventionally. At 16 we have illustrated a means for depositing paste or pulp on the underside of the conveyor. This comprises in general a revolving roller 17 having a circumference 18 of wire cloth which dips into a mass of paste or pulp 19 in the bottom of the casing 20. This type of device for depositing paste or pulp on the underside of the conveyor is known in the art and is identified as the cylinder and vat or millboard type.

At 21 we have illustrated another means for depositing paste or pulp on the conveyor. This comprises a receptacle 22 having an opening or openings 23 through which paste or pulp 24 may be deposited on the conveyor 10. The paste or pulp is fed to the receptacle 22 through a chute 25 leading from a set of feeding rollers 26 which are supplied from a hopper 27. This latter means of feeding the paste or pulp to the conveyor is also known in the art and is commercially known as the Fourdrinier type. Although either means for applying the layer of paste or pulp to the conveyor may be employed without the other, we have illustrated both types and will hereinafter describe how either one may be used to apply the thin layer, and how the other may be used to apply the extra material for the crests and vales, when such material is employed. It is, of course, understood that any other means may be employed to deposit either the thin layer or the extra material, or both, to the conveyor.

30 and 31 are lower or breast rollers over which the conveyor 10 passes. These rollers are corrugated as illustrated in Figure 2, in which roller 30 is shown. Resting upon the conveyor 10 above roller 30 is an upper or press roller 32. The axis of the roller 30 is preferably fixed whereas the axis of the roller 32 is preferably capable of vertical movement. However, any other arrangement may be provided to bring the rollers into contact with the conveyor.

Above the roller 31 is a corrugated upper or press roller 33, which is shown held up out of contact with the conveyor 10, the purpose of which will be set forth hereinafter.

The rollers 32 and 33 as well as the rollers 30 and 31 may be mounted and supported by any suitable means not shown. The rollers 32 and 33 are preferably not driven and are so arranged that they may be easily removed from their supports. Rollers 30 and 31 are preferably driven by means not shown, such as shafts, gearing, belts, etc.

Roller 12 is also driven preferably at the same peripheral speed as rollers 30 and 31, and is the main driving roller. To increase the traction on the roller 12 as well as to straighten the conveyor 10 after it leaves the corrugated rollers, we provide a cylindrical smooth surfaced upper or press roller 13 which rests upon conveyor 10 directly above the roller 12. The roller 13 is preferably, though not necessarily, an idler roller and is so arranged that it is supported by the roller 12. Rollers 32 and 33 are similarly supported by rollers 30 and 31 respectively. At 34 is shown the layer of paste or pulp on the conveyor 10, and at 35 strips of additional material for the crests and vales.

In Figure 2 are shown diagrammatically thin layer 34 and additional material 35 passing through a set of corrugated rollers. It is understood that the position of layer 34 and material 35 as represented corresponds to a fraction of one revolution of the roller 32 and that as the revolutions of roller 32 increase the material 35 will be interposed between convolutions of layer 34. The same is true of the representation of layer 34 and material 35 in Figure 6. It will be noted that the breast and press rollers are so corrugated that the corrugations mesh one with the other.

In Figure 7 we have illustrated a manner in which the receptacle 22 may be modified to adapt same for depositing the strips 35 by providing cut-out portions 36, in the smoothing and scraper portion 37 of the receptacle 22, and by raising the receptacle 22 to permit the layer 34 deposited at 16 to pass thereunder. The additional material may be arranged on the layer 34 in strips or otherwise within the opening 23. The additional material will pass out through the cut-out portions 36. Instead of one large opening at 23 a plurality of openings in line with the cut-out portions 36 may be provided.

In operation the conveyor 10 is driven in the direction shown by the arrows. As illustrated the layer of paste or pulp 34 is deposited on the underside of the conveyor 10 by the cylinder and vat mechanism shown at 16. If strips 35 are to be deposited on the layer 34 this may be accomplished by the device shown at 21 if desired. It is, of course, understood that the layers and strips or other forms of additional material may be deposited by any other means. The means shown at 16, for instance, may be used to deposit the additional material directly to the conveyor 10 and the additional material may then be covered by the layer 34 deposited at 21 if desired. The conveyor 10 carries the paste or pulp forward toward the corrugated breast and press rollers 30 and 32. During this time water is separated from the paste or pulp, for instance, by passing through the conveyor and by drying mechanism such as illustrated at 15. Any other means may be provided for separating the liquid matter. Upon reaching the rollers 30 and 32 the paste or pulp is pressed into corrugated shape and is picked up by the roller 32 upon which it is wound until it acquires the desired thickness. The roller 32 is then raised out of contact with the conveyor 10, and the roller 33 is lowered. The paste or pulp now collects on the roller 33. Roller 32 is removed and the material is cut therefrom and straightened longitudinally into sheet form and may be cut to size, further processed etc., if desired. This sheet is of corrugated cross section similar to that illustrated at 40 in Figure 3.

When the material has collected on roller 33 to the required thickness, this roller is raised and roller 32, which has been stripped of its material is again placed in contact with the conveyor 10. The material is now removed from the roller 33 in the same manner as above described with respect to the roller 32. The rollers 32 and 33 are thus brought alternately into contact with the conveyor 10. By removal of these rollers for the purpose of cutting the material therefrom, damage to the conveyor due to the dropping of the rollers by the removal of the trailing ends of the stripped sheets is avoided. Furthermore the device is capable of continuous operation.

The conveyor 10 in passing between the corrugated rollers assumes a corrugated cross section. The conveyor is smoothed out by the smooth rollers 12 and 13 when the latter are employed.

In Figure 3 it will be noted that the crest 41 and the vale 42 are thicker than the tangents 43. This particular form is provided for proper meshing or nesting of superimposed or overlapping sheets as above pointed out. However, it is to be understood that the invention is not limited to any particular shape of corrugation nor to the addition of material at the crests and vales, but covers all forms of corrugation regardless of shape. It is understood that the corrugations on the rollers are so formed and shaped as to produce the desired results in the sheet.

In Figure 8 is diagrammatically illustrated in plan view (shown broken) the conveyor 10 passing over rollers 12, 30, and 31 with rollers 13, 32 and 33 removed. As illustrated the material is being picked up by the roller 32. The conveyor 10 is narrowed somewhat due to its being pressed into the corrugations and is shown being straightened out by passing over the roller 12. The coaction of the roller 13 is desirable for this purpose.

In Figure 4 is shown a cross section of a corrugated sheet having a crest 45 of lesser radius than vale 46. The material in the vale 46 below the center line 47 is much greater than the material in the crest 45 above the center line 47. The material used in forming the sheet 44 shown in Figure 4 is scarcely greater in quantity than material used in forming the sheet 40 shown in Figure 3. However, if the force applied to the sheet 44 is such that the material in vale 46 is subjected to tensile stresses and the material in crest 45 is subjected to compressive stresses, the sheet 44 under such forces will be very much stronger than sheet 40 would be under similar circumstances. The terms crest and vale are merely used for the purpose of explanation, it being obvious that if the sheet 44 were turned upside down that the terms would be reversed. Therefore for the purposes of the claims these terms are inter-changeable. The sheets may have any number of corrugations. One or more of the portions on one side of the transverse center line are formed with a greater amount of material than one or more of the portions on the other side of the center line. All of the corrugations having a greater amount of material may be on one side of a transverse center line. However, the corrugations with a greater amount of material may be on opposite sides of a center line at different points if desired to meet certain requirements, or such corrugations may be interspersed with those of regular form without departing from the spirit of the invention.

In Figure 6 are shown lower or breast roller 48 and upper or press roller 49 having corrugated meshing circumferences adapted to form a sheet having a cross section similar to that shown in Figure 4. Crest 50 of roller 49 is of larger radius and meshes with vale 51 of roller 48 which is also of larger radius. Vale 52 of roller 49 meshes with crest 53 of roller 48. Meshing does not mean that the surfaces are capable of contact, but merely that they are capable of coacting to form a corrugation of a desired shape although it is intended to include contacting shapes. Rollers 48 and 49 are interchangeable with rollers having other forms of corrugations.

While we have described our invention in connection with the manufacture of corrugated sheets made with cement and asbestos fiber, it is, of course, obvious that it may be applied to the manufacture of sheets of any material capable of being wound up by a corrugated roller. The corrugated breast and press rollers may be adapted to any type of machine and one or more corrugated rollers may be employed. The corrugated rollers have for convenience been illustrated as being solid in cross section. However, these rollers may be made hollow or in any other form, the only limitation being that of a corrugated surface. The conveyor 10 need not pass over the roller 12 but may be supported at its end by a corrugated roller such as the roller 30. Any form of drying means may be provided, as well as conveyor cleaning means, the latter being illustrated conventionally at 54.

For the purpose of the claims the term "pulp" is intended to include paste and like materials.

Having described our invention, it is obvious that many modifications may be made in the same, within the scope of the claims, without departing from the spirit thereof.

We claim:

1. In a process of forming corrugated sheets having thickened crests and vales from a cementitious pulp, the steps which comprise depositing a layer of pulp on a conveyor, depositing additional material on said layer in line with portions of said layer intended to form the crest and vale portions of the finished sheet, and then passing the composite layer through corrugating rollers with the portions carrying additional material in line with the crest and vale-forming portions of said rollers.

2. In a process of forming corrugated sheets having thickened crests and vales from a cementitious pulp, the steps which comprise depositing pulp on a conveyor in strips spaced to align with the crest and vale portions of the finished sheet, depositing a layer of pulp on said conveyor in superimposed relation to said strips, and then passing the composite layer through corrugating rollers with the portions carrying additional material in line with the crest and vale-forming portions of said rollers.

3. A corrugated sheet formed of a pulp containing a cementitious material and having corrugated curved portions on opposite sides of a transverse center line of unequal radii.

4. A corrugated sheet formed from a cementitious pulp and having corrugated curved portions on one side of a transverse center line of greater average radius than those on the other.

5. A process for forming a corrugated sheet having a thickened corrugated portion from a cementitious pulp, comprising winding a layer of said material on to a corrugated roller and adding additional pulp material to a localized area of said layer in line with the corrugation-forming portion of said roller and pressing the added pulp material into bonding relation with the underlying layer.

6. A process for forming a corrugated sheet having a thickened corrugated portion from a cementitious pulp, comprising winding a layer of said material on to a corrugated roller, and, as the winding of the layer progresses, associating additional pulp with said layer along a localized area thereof in line with the desired thickened portion, and causing said added pulp to become bonded to said layer.

7. In a process for forming a corrugated sheet having thickened crests and vales from a cementitious pulp, the steps which comprise winding a layer of said pulp on to a corrugated roller, associating additional pulp with said layer along localized areas thereof in line with the crest and vale-forming portions of said roller, and causing said added pulp to be pressed into bonded relation to said layer.

8. A process for making corrugated sheets having thickened crests and vales comprising depositing a layer of pulp on a supporting surface, contacting said layer while on said surface with a corrugated roller, transferring said layer to said corrugated roller by winding said layer on to said corrugated roller, said layer being thickened along the lines of the crest and vale forming portions thereof.

9. A process for making a corrugated sheet of cementitious pulp having a greater amount of material disposed in the vales than in the crests, comprising spreading a layer of pulp upon a supporting surface with additional material disposed in localized areas coinciding with the vale and crest portions of the finished sheet, contacting said layer with a corrugated roller having vale forming portions of greater average radius than the average radius of the crest-forming portions, and transferring said layer to said corrugated roller by winding the same up thereon.

10. A corrugated sheet formed of a cementitious pulp and having unequal amounts of material in adjacent corrugations disposed on opposite sides of the transverse center line thereof.

11. A corrugated sheet formed of a cementitious material and having a larger amount of material on one side of its transverse center line than on the other.

12. A corrugated sheet formed of a cementitious pulp and having a larger amount of material disposed in the vales than in the crests.

13. A corrugated sheet formed of a pulp comprising asbestos fibre and hydraulic cement and having a larger amount of material disposed in a vale than in a crest.

14. A corrugated sheet formed from pulp containing a cementitious material, said sheet having corrugations with thickened curved portions, said curved portions on one side of said sheet being of greater average radius than the similar curved portions on the other side of said sheet.

15. A corrugated sheet formed of a cementitious pulp and having adjacent corrugations with thickened curved portions and with unequal radii of curvature.

FREDERICK W. SCHRODER.
MARTIN WILLIS.